United States Patent
Hase et al.

(10) Patent No.: US 9,300,397 B2
(45) Date of Patent: Mar. 29, 2016

(54) MULTIFUNCTIONAL OPTICAL MICRO SENSOR SYSTEM

(71) Applicant: Elmos Semiconductor AG, Dortmund (DE)

(72) Inventors: Michael Hase, Wiesloch (DE); Michael Domokos, Kuernbach (DE); Uwe Hendrik Hill, Remchingen (DE)

(73) Assignee: Elmos Semiconductor AG, Dortmund (DE)

( * ) Notice: Subject to any disclaimer, the term of this patent is extended or adjusted under 35 U.S.C. 154(b) by 0 days.

(21) Appl. No.: 14/384,217

(22) PCT Filed: Jan. 22, 2014

(86) PCT No.: PCT/DE2014/000024
§ 371 (c)(1),
(2) Date: Nov. 24, 2014

(87) PCT Pub. No.: WO2014/131385
PCT Pub. Date: Sep. 4, 2014

(65) Prior Publication Data
US 2015/0110485 A1    Apr. 23, 2015

(30) Foreign Application Priority Data

Feb. 27, 2013 (DE) .......................... 10 2013 003 791
Mar. 28, 2013 (DE) .......................... 10 2013 005 787
Aug. 29, 2013 (WO) ................ PCT/DE2013/000495

(51) Int. Cl.
*H04B 10/08*    (2006.01)
*H04B 10/079*    (2013.01)
(Continued)

(52) U.S. Cl.
CPC .......... *H04B 10/0795* (2013.01); *G01S 7/4813* (2013.01); *G01S 7/4814* (2013.01); *G01S 7/4816* (2013.01); *G01S 7/497* (2013.01); *G01S 17/026* (2013.01)

(58) Field of Classification Search
CPC ............. H04B 10/079; H04B 10/2507; H04B 10/2543; H04B 10/564
See application file for complete search history.

(56) References Cited

U.S. PATENT DOCUMENTS

2004/0100682 A1* 5/2004 Fujiwara ............... G02F 1/0121
                                                      359/326
2004/0246568 A1* 12/2004 Onaka .................. H04B 10/291
                                                      359/337

(Continued)

FOREIGN PATENT DOCUMENTS

DE          10256429 A1    6/2004
DE     102006003269 A1    7/2007

(Continued)

OTHER PUBLICATIONS

International Search Report for PCT/DE2014/000024 dated Jul. 9, 2014 (3 pages).

*Primary Examiner* — Dzung Tran
(74) *Attorney, Agent, or Firm* — Bejin Bieneman PLC

(57) ABSTRACT

A device for measuring a measured optical transmission path includes a first optical transmitter transmitting into the measured optical tramsmission path and a compensation transmitter transmitting into a compensation optical transmission path. The device includes an optical receiver for receiving transmissions from each of the first optical transmitter and the compensation transmitter. A controller controls the compensation transmitter and provides a controller output signal representative of a measured value of the first transmission path. A nose piece separates the optical transmitter from the optical receiver. The compensation transmitter is placed in a first cavity. The receiver is placed in a second cavity. A filter in the measured optical transmission path has a transmissivity for the wavelength of the light of the first optical transmitter of at least 50% and an absorption factor for the wavelength of the light of the compensation transmitter of at least 25%.

9 Claims, 12 Drawing Sheets

(51) Int. Cl.
*G01S 17/02* (2006.01)
*G01S 7/481* (2006.01)
*G01S 7/497* (2006.01)

(56) References Cited

U.S. PATENT DOCUMENTS

| | | | | |
|---|---|---|---|---|
| 2005/0147415 | A1* | 7/2005 | Fee | H04B 10/2519 398/159 |
| 2006/0038975 | A1* | 2/2006 | Doerr | G02B 6/12007 356/10 |
| 2008/0085125 | A1* | 4/2008 | Frankel | H04B 10/0795 398/159 |
| 2012/0213532 | A1* | 8/2012 | Hironishi | H04B 10/6165 398/208 |
| 2013/0170828 | A1* | 7/2013 | McClean | H04B 10/0775 398/26 |
| 2013/0301978 | A1* | 11/2013 | Meyer | G01D 5/35358 385/12 |

FOREIGN PATENT DOCUMENTS

| | | |
|---|---|---|
| DE | 102006020570 A1 | 11/2007 |
| DE | 102010014462 A1 | 10/2011 |
| DE | 102010028967 A1 | 10/2011 |
| DE | 102010027499 A1 | 1/2012 |
| DE | 102012102056 A1 | 10/2012 |
| DE | 102012210891 A1 | 1/2013 |
| EP | 2418512 A1 | 2/2012 |
| EP | 2549652 A2 | 1/2013 |
| WO | 2013134456 A1 | 9/2013 |

* cited by examiner

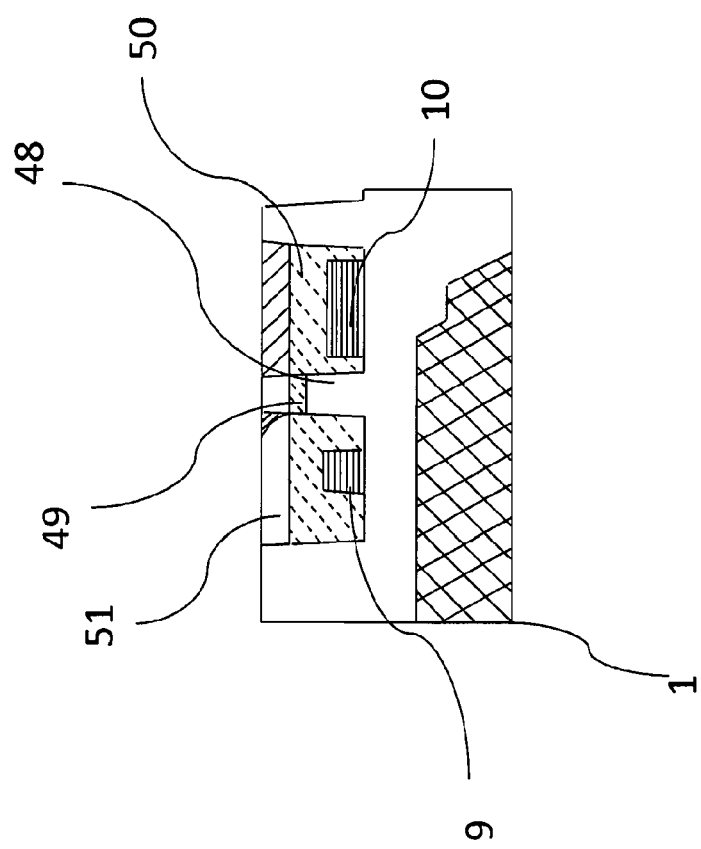

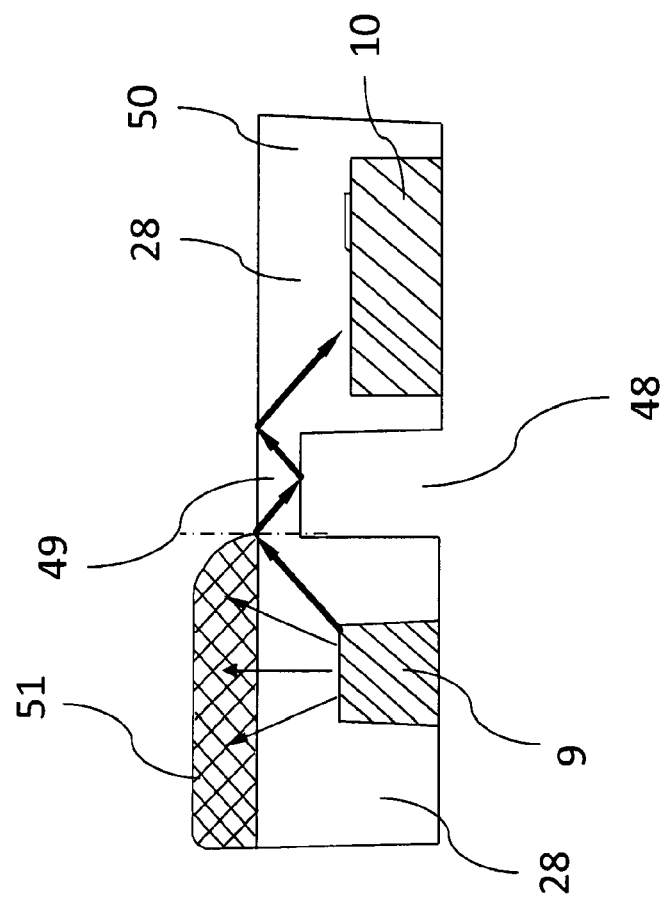

MULTIFUNCTIONAL OPTICAL MICRO SENSOR SYSTEM

CROSS REFERENCE TO RELATED APPLICATIONS

This application is a National Phase of, and claims priority to, International Application No. PCT/DE2014/000024, filed on Jan. 22, 2014, which claims priority to German Application No. DE 10 2013 003 791.3 filed on Feb. 27, 2013, and German Application No. DE 10 2013 005 787.6 filed on Mar. 28, 2013, and International Application No. PCT/DE2013/000495, filed on Aug. 29, 2013, each of which applications are hereby incorporated by reference in their entireties.

BACKGROUND

For three dimensional gesture recognition, e.g. the recognition of wipe and approximation gestures, sensors are required that are capable to detect the position, the movement and the orientation of hands.

As an alternative to or in conjunction with camera based systems, the usage of simple LED and photodiode based concepts is of special interest due to the corresponding cost point.

A significant problem known from state of the art is the available assembly space. Different methods have been developed to improve the robustness against external light and other disturbances.

There exist state of the art systems having a generator (G) producing a transmission signal (S5). This transmission signal (S5) drives a transmitter (H). The transmitter (H) transmits into a receiver (D) having passed the transmission path to be measured. The transmission path to be measured consists out of a first partial transmission path (I1) and a second partial transmission path (I2). A controller (CT converts the receiver output signal (S0) of the receiver (D) to a compensation signal (S3). The compensation signal (S3) drives the compensation transmitter (K). The compensation transmitter (K) transmits into the third transmission path (I3). Via the third transmission path (I3) the compensation transmitter (K) transmits typically in a linear superimposing manner into the receiver (D). The controller (CT) generates the compensation signal (S3) out of the receiver output signal (S0) and the transmitter signal (S5) such that the receiver output signal (S0) contains no remaining components of the transmitter signal (S5) with the exception of system noise and a control error. Such systems are called HALIOS systems in the following sections. These systems possess a special robustness against sources of interference, e.g., sun light. Further, HALIOS systems are robust against dirt and receiver (D) drift.

Such a HALIOS system is known from DE102010014462A1 or EP2418512A1 for example.

In general there are two basic HALIOS system versions known from the state of the art. It is possible to mix these two basic HALIOS versions by switching between them or by smooth transitions between the different controller properties. Because the first claim refers to HALIOS systems in general we subsequently give a definition for such state of the art HALIOS systems to be able to keep the claims short and compact.

A HALIOS system as used within this text is characterized
  i. that in a first version
    a. It possesses at least one signal generator (G) able to produce at least one transmitter signal (S5), driving at least one transmitter (H) that irradiates into at least one receiver (D) and
    b. that it possess at least one controller (CT) producing at least one compensation signal (S3) that drives at least one compensation transmitter (K) which transmits in a superimposing manner into the at least one receiver (D) and
    c. that the controller (CT) generates the at least one compensation signal (S3) out of at least one of a receiver output signal (S0) of said receiver (D) and the at least one transmitter signal (S5) and
    d. that the controller (CT) drives the at least one compensation transmitter (K) so that the receiver output signal (S0) of the receiver (D) contains no remaining components of the transmitter signal (S5) except for a control error and system noise
  or that in a second version
    e. that it possesses at least one signal generator (G) able to produce at least one compensation signal (S3), driving at least one compensation transmitter (K), that transmits into at least one receiver (D) and
    f. that it possesses at least one controller (CT) producing at least one transmitter signal (S5) that drives at least one transmitter (H) which transmits in a superimposing manner into the at least one receiver (D) and,
    g. that said controller (CT) generates the at least one transmitter signal (S5) out of at least one of a receiver output signal (S0) of the receiver (D) and the at least one compensation transmitter signal (S3) and
    h. that the controller (CT) drives the at least one transmitter (H) such that the receiver output signal (S0) of the receiver (D) contains no remaining components of the compensation transmitter signal (S3) except for a control error and system noise
    or
  ii. that it is a mixture of the first and second version and
  iii. that the at least one optical transmitter (H) is able to transmit into a first transmission path (I1) that is only partially part of the apparatus, and
  iv. at least one object (O), that is not part of the apparatus and located at the end of the first transmission path (I1), is able to transmit light into at least a second transmission path (I2), that is only partially part of the apparatus and that terminates, at the at least one receiver (D), that is part of the apparatus, and
  v. that the at least one receiver (D) is able to receive the transmission signal (S5) modified by the transmission through the first transmission path (I1) and/or the second transmission path (I2) and/or the reflection by the object (O) and to transform the transmission signal (S5) into a receiver output signal (S0) and
  vi. that the at least one controller (CT), being part of the apparatus, outputs at least one signal (S4), that may be used outside the apparatus and
  vii. that the at least one signal (S4) is a representative measure for at least one property of the at least one first transmission path (I1) or of the at least one second transmission path or at least a representative measure for at least one property of the at least one object (O) at the end of the first transmission path (I1) or at the opening of said second transmission path (I2) and that this measure is output via the output signal (S4) at least on request and
  viii. that the compensation transmitter (K) transmits into at least a third transmission path (I3) that is completely part of the apparatus and
  ix. that the third transmission path (I3) ends at the at least one receiver (D) and x. that at least the receiver (D) receives in a superimposing manner at least the signal of the compensation transmitter (K) and the signal of the transmitter (H).

The assembly of such a HALIOS system into one single SMD package represents several challenges regarding optics and processability.

The DE102010014462A1 does not disclose the required optical system and does not address this problem. One might extract several optical components and special arrangements of optical elements in conjunction with HALIOS systems from DE102010028967A1. In conjunction with the elaboration of this disclosure it was recognized that the backscattering of the light from the compensation transmitter (K) from the receiver (D), typically a photodiode, to the object (O) and then from the object (O) again back to the receiver (D) results in a disturbance signal in the receiver (D). The problem becomes noticeable as an environment dependent basic coupling. This problem is not discussed nor solved in the DE102010028967A1. The semitransparent mirror (e.g. FIG. 9, reference symbol 192 of DE102010028967A1) still results in a continued emission of light from the compensation transmitters (K) that might be scattered towards the object (O).

Patent application DE102012210891A1 discloses an exemplary state of the art package addressing this problem.

There are two potential transmission paths between each transmitter (H) and the object (O) in general: The valuable transmission path (I1 & I2, I3) and a parasitic transmission path. The light of the transmitter (H) may be transmitted from the transmitter (H) to the object (O) first and from there it may be reflected to the photodiode, the receiver (D). The light of the transmitter (H) light should not shine directly onto the photodiode (D). The situation is the opposite for the light of the compensation transmitter (K). It should shine directly on the photodiode (D) and should not be dispersed onto the object (O).

A maximum of transmitted energy should reach the object to be detected and the receiver (D) should detect a maximum of light reflected by the object. In the state of the art DE102012210891A1, for example, proposes a lens that is arranged coaxially to the transmitter or receiver center point. (FIG. 3 of the DE102012210891A1). A problem of the technology disclosed by DE102012210891A1 is that the exterior space illumination is lower in contrast to the illumination within the device embodying the invention. The lenses (reference numbers 218 and 312 of DE102012210891 A1) are lowered relative to the top cover (reference numbers 219 and 319 of DE102012210891A1) by a small rim. This rim further limits the illumination. The DE102012210891A1 achieves the required space illumination by a complex three-dimensional assembly of multiple sensor modules (FIG. 6 of DE102012210891A1). The patent application DE102010027499A1 solves this illumination problem (FIG. 1 of DE102010027499A1) by multiple usage of a module corresponding to DE102010027499A1.

The described illumination problem is similarly solved in the European patent application EP2549652A2. However the three-dimensional assembly is carried out not on module level but on component level. This complex three-dimensional assembly of transmitters and receivers causes an already improved spatial illumination in comparison to DE102012210891A1 (FIGS. 5a and 5b of EP2549652A2). Thereby the lenses are always arranged coaxial to the transmitters and receivers (FIGS. 2 and 4 of EP2549652A2) as disclosed in DE102012210891A1. As before a U-shaped package (reference number 130 of EP2549652A2) causes shadowing effects on the receiver (reference number 200 of EP2549652A2). The trough walls limit its receiver beams.

The international application WO20131134456A1 discloses an assembly of a HALIOS system taking advantage of a glass fiber in a PCB. The transmission diode (reference number 102 of WO20131134456A1) is drawn in FIG. 1 of said patent application in conjunction with a lens. The lens is arranged centrically. Said shadowing problem is caused by the walls of the mounting hole. (reference number 109 of WO20131134456A1). Therefore the illumination is not optimal here as well.

The solution to this problem presented in patent application DE102006020570A1 is significantly better. It is not, however, the objective of the system to supervise the entire open space above the system, but only a limited space immediately above the sensor system. As before, the central lens (reference numbers 21 and 53 of DE102006020570A1) is arranged centrically relatively to the receiver (reference number E of DE102006020570A1). A symmetrical illumination is not possible based on this solution. The transmitters possess lenses.

A significant problem of HALIOS system integration in one package is the suppression of parasitic couplings. The miniaturization increases the problem identified as cross-talk in the following paragraphs. Especially the exposure of the object to be measured to scattered light from the compensation transmitter (K) changes the basic coupling dependent on the usage situation. This situation dependent basic coupling was already described in the European patent application EP2418512A1. In the following disclosure we refer to this patent application and further state of the art publications to differentiate the principles of the disclosure from prior art. First of all we state that all already named publications and all publications referenced in the following description do not address the problem of a situation dependent basic coupling of scattered light from the compensation transmitter.

SUMMARY

The objective of the disclosure is to enable the integration of the different optical sensors and sensor components being part of a HALIOS system in a single SMD package and to reduce the cross-talk and to enable the optimal illumination and system sensitivity. A complex three-dimensional arrangement of transmitters and receivers shall be avoided. The light of the compensation transmitter is dissipated within the system so that a situation dependent basic coupling according to the state of the art systems is avoided.

A system according to claim 1 fulfills this objective.

DRAWINGS

Figure 1:
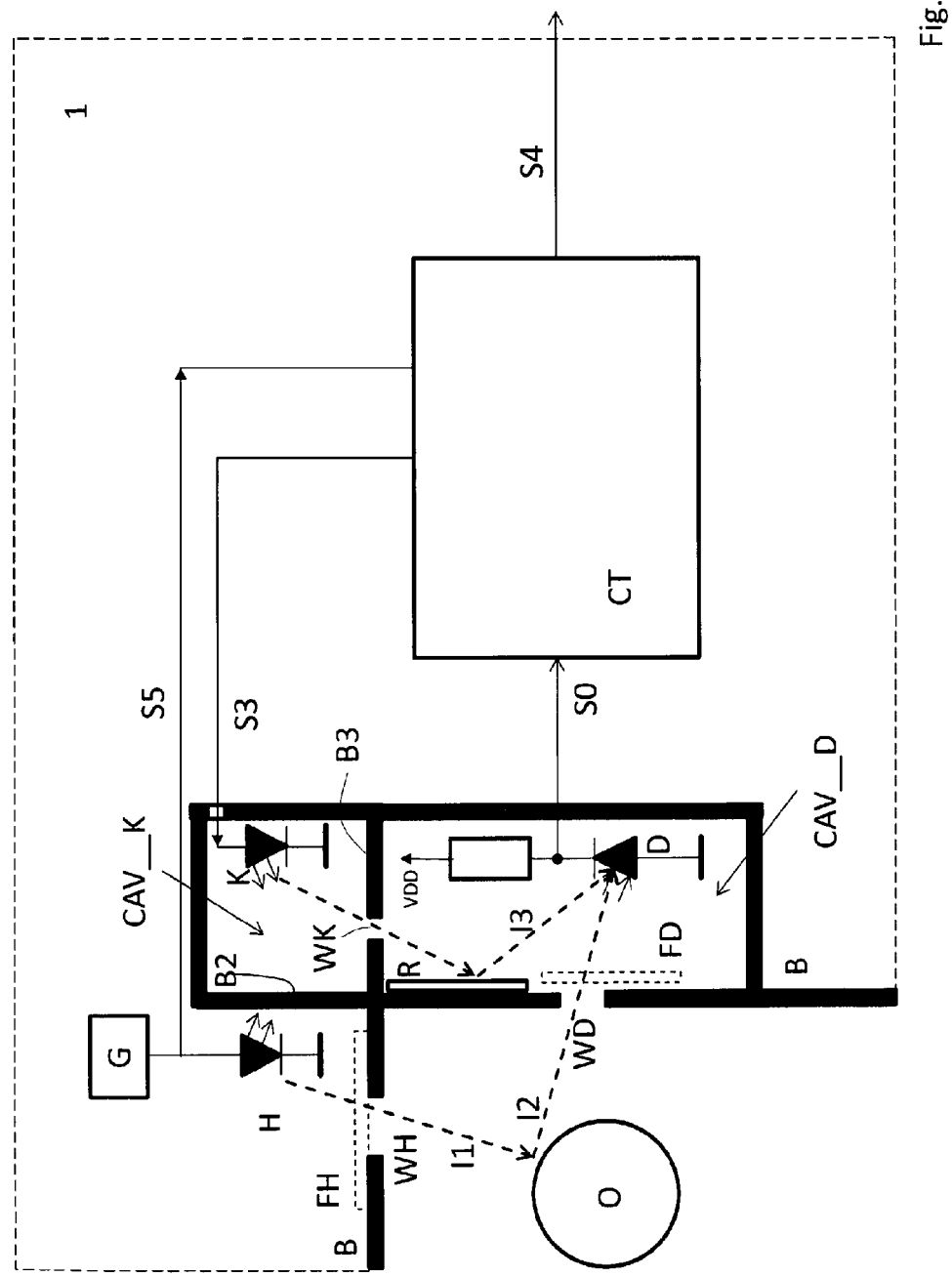
FIG. 1 is a diagram of an exemplary device for measuring an optical transmission path according to the principles of the disclosure.
Figure 8:
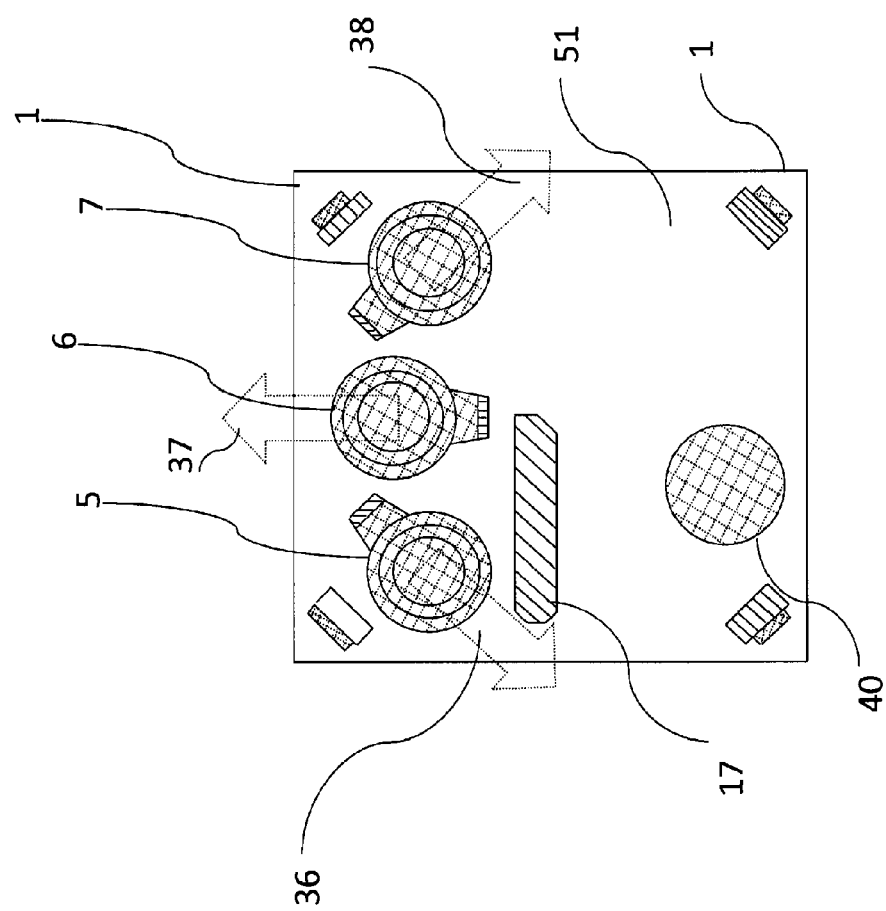

FIG. 8 FIG. 8 illustrates exemplary orientations of emitted beams from transmitter diodes of the exemplary device according to FIG. 1.

Figure 9:
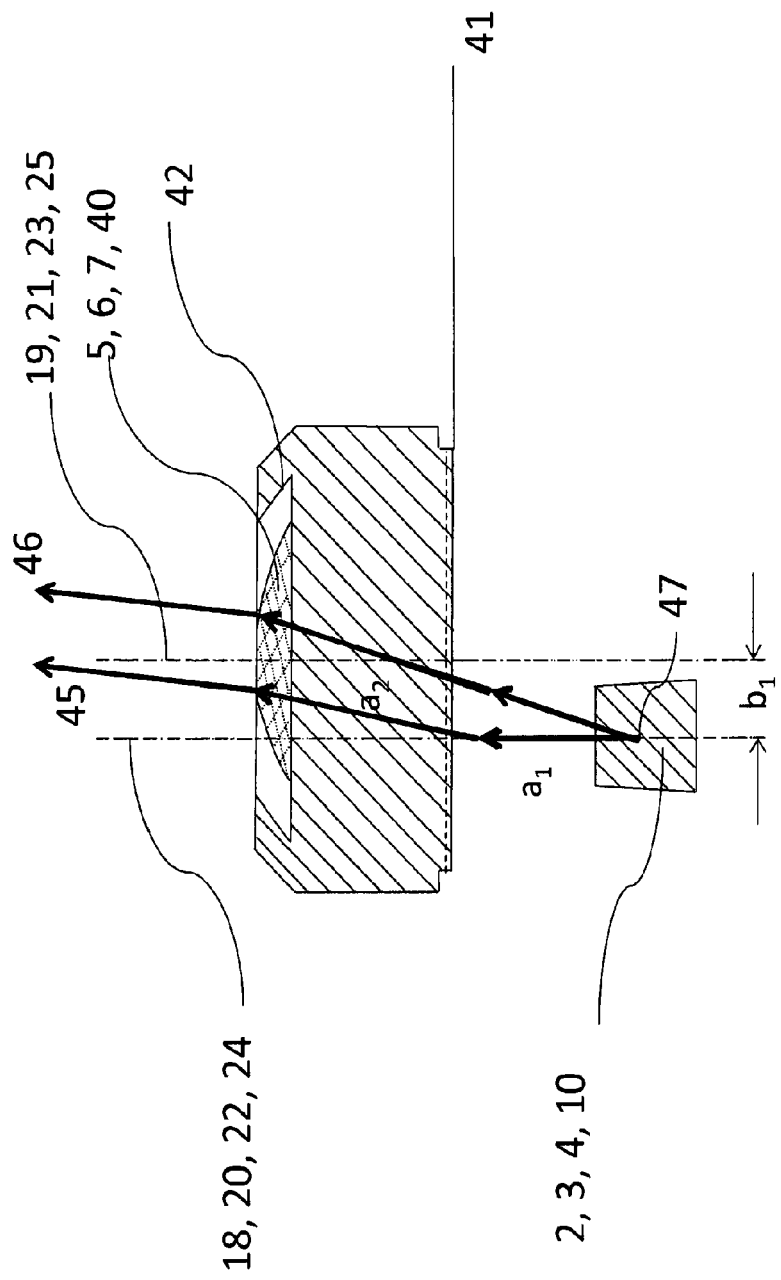

FIG. 9 illustrates an exemplary method for generating the exemplary emitted beams of FIG. 8.

Figure 10:
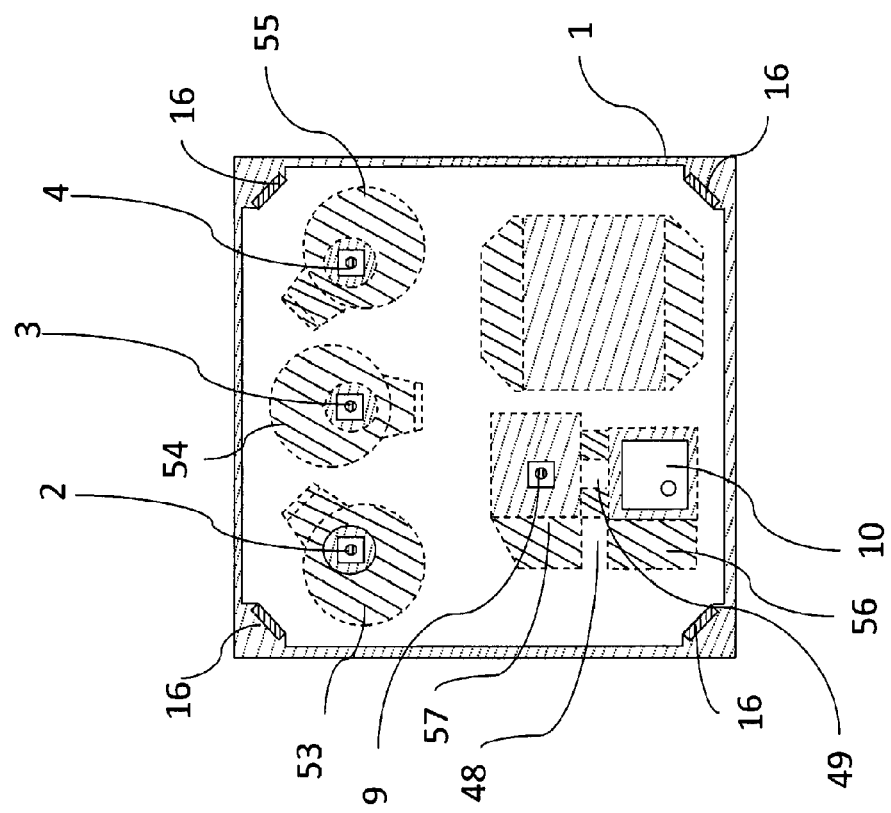

FIG. 10 illustrates a horizontal cross section of the exemplary device according to FIG. 1.

FIG. 11 illustrates a cross section through the compensation transmitter of the exemplary device according to FIG. 1.

FIG. 12 illustrates an exemplary optical transmission path between a compensation transmitter and a receiver according in the exemplary device according to FIG. 1.

DETAILED DESCRIPTION

The construction and the operation of the apparatus according to the principles of the disclosure are described using the accompanying figures.

FIG. 1 sketches an apparatus according to the disclosure. A photodiode with a series resistor between ground and power supply voltage symbolizes the receiver (D).

In addition to prior art publications an optical barrier (B) is drawn up in FIG. 1. The optical barrier (B) ensures that light of the compensation transmitter, the compensation diode (K), does not shine directly on the object (O). The function of that barrier, known from EP2418512A1 is as follows: To ensure that the transmitter (H) is able to illuminate the object (O) via the first transmission path (I1), the optical barrier (B) must show an optical transmission path window (WH). The optical transmission path window (WH) must be transparent for the radiation of the transmitter (H), i.e., for the wave length of the radiation from transmitter (H). The wavelength of the radiation from transmitter (H) is referred to as a transmitter wave length in the following sections. For the same reason, the barrier (B) must have a second optical receiver path window (WD) in the region of the second transmission path (I2). The optical receiver path window (WD) should be transparent for the radiation to be detected, especially for the wavelength of the radiation to be detected. The wavelength of the radiation to be detected is typically the same wavelength as the transmitter wavelength. This, however, needs not always to be the case. It is for example possible that the object (O) is fluorescent when being illuminated by the transmitter (H), and that only the fluorescence is intended to be measured. In this case the receiver path window (WD) is typically chosen to be only transparent for the wavelength of the fluorescent radiation, the fluorescence wavelength, if possible.

The light of the compensation transmitter (K) should not be able to escape outwards. Therefore it is useful that the receiver path window (WD) and the transmitter path window (WH) are not transparent for the wavelength of the light of the compensation transmitter (K), the compensation transmitter wavelength and it is useful that they absorb light of that wavelength. These windows should be configured not to reflect the light of the compensation transmitter (K) so that the light of the compensation transmitter (K) is dissipated within the system in order to ensure that the light does not remain in the system due to multiple reflections and result in signal distortions. The receiver path window (WD) in front of the detector must be transparent for the wavelength of the radiation to be detected, typically the transmitter wavelength or the fluorescence wavelength. It must reliably suppress radiation of the compensation transmitter wavelength. In this case the compensation transmitter (K) appropriately transmits using another wavelength than the transmitter (H). The compensation transmitter wavelength should be different from the transmitter wavelength. Preferably the windows possess filters in order to fulfill the requirements regarding transmissivity and reflectivity. Namely, they should possess a transmission path filter (FH) for the transmission path and a receiver path filter (FD) for the receiver path.

It is useful to define the preceding terms more precisely.

In the following sections transmissivity means the portion of light not damped at a center wavelength of the light beam intensity (energy) when passing a filter or a set up component in comparison to the light beam intensity (energy) of the incident light before the passage through the object. For example, in the case of a damping by 50%, the transmissivity is 50%.

In the following sections reflectivity means that portion of light not damped at a center wave length of the light beam intensity (energy) when reflected at a filter or a set up component in comparison to the light beam intensity (energy) of the incident light before the reflection at the object. In the case of a damping by 50% the reflectivity is 50%, for example.

In the following sections absorption factor means the degree of light beam intensity (energy) reduction of a light beam at a defined center wavelength during reflection at a filter or a package component and parallel transmission through said filter and said package component in comparison to the light beam intensity (energy) of the incident light beam before the reflection at the object. This energy remains in the object and is not reflected and transmitted. With a transmissivity of 25% and a reflectivity of 25% the absorption factor is 50%, for example.

With respect to the disclosure conform set up the transmission path filter (FH) shall have a transmissivity at the transmitters (H) wavelength, at the transmitter wavelength, of optimally 100%, of at least 50%, or better at least 75%, or better at least 88%, or better at least 95%, or better at least 98%, or better at least 99%.

The transmission path filter (FH) preferably shall have at the transmitter's (H) wavelength, the transmitter wavelength, a reflectivity of optimally 0%, of at most 50%, or better at most 25%, or better at most 12%, or better at most 5%, or better at most 2%, or better at most 1%.

At the wavelength of the compensation transmitter (K), the compensation transmitter wavelength, the transmission path filter (FH) preferably shall have in parallel a transmissivity of optimally 0%, of at most 50%, or better at most 25%, or better at most 12%, or better at most 5%, or better at most 2%, or better at most 1%.

At the wavelength of the compensation transmitter (K), the compensation transmitter wavelength, the transmission path filter (FH) preferably shall have in parallel an absorption factor of optimally 100%, of at least 25%, or better at least 50%, or better at least 75%, or better at least 88%, or better at least 95%, or better at least 98%, or better at least 99%.

At the wavelength of the transmitter (H), the transmitter wavelength, or at the wavelength of the radiation to be detected the receiver path filter (FD) preferably shall have a transmissivity of optimally 100%, of at least 50%, or better at least 75%, or better at least 88%, or better at least 95%, or better at least 98% or better at least 99%.

At the wavelength of the compensation transmitter (K), the compensation transmitter wavelength, the receiver path filter (FD) preferably shall have in parallel a transmissivity of optimally 0%, of at most 50%, or better at most 25%, or better at most 12%, or better at most 5%, or better at most 2%, or better at most 1%.

At the wavelength of the compensation transmitter (K), the compensation transmitter wavelength, the receiver path filter (FD) preferably should have in parallel an absorption factor of optimally 100%, of at least 25%, or better at least 50%, or better at least 75%, or better at least 88%, or better at least 95%, or better at least 98%, or better at least 99%.

In any case it is better to have a high absorption factor for the wavelength of the compensation transmitter (K), the compensation transmitter wavelength, than to have an increased reflectivity.

In any case this enables the receiver (D) to receive the signal of the compensation transmitter (K), the compensation transmitter diode, and the signal of the transmitter (H) as well. The receiver (D) must be sensitive for the compensation transmitter wavelength and the wavelength of the radiation to be detected, which typically means the transmitter wavelength and/or the fluorescence wavelength.

The usage of transmission path windows is already known from US20050184301A1 (e.g. FIG. 12, reference numbers 85 to 89 of the US20050184301A1). However their function is to select the incoming light of a transmitter (e.g. FIG. 18, reference numbers 132-136 of US20050184301A1) after reflection by an object to be measured (e.g. FIG. 18, reference number 146 of US20050184301A1)

In a device conforming to the principles of the disclosure, it is necessary to ensure on the one hand that the light of the transmitter (H) which is reflected in a comparable way is able to enter the device and thereby is able to reach the receiver (D). On the other hand it is necessary to ensure that the light of the compensation transmitter (K) is not able to leave the system and that it is dissipated as fast as possible with a lowest possible number of reflections within the system.

If the light of the compensation transmitter (K) is able to leave the system the effectiveness of the system is adversely affected. In this case the base coupling which is discussed extensively in the patent application EP2418512A1 is dependent on the properties of the object (O) to be measured in the transmission path which consists of the first transmission path (I1) and the second transmission path (I2).

In addition all materials within the device including filters and optical elements should be configured for other than the following three cases, to have an absorption factor of optimally 100%, of at least 25%, better at least 50%, better at least 75%, better at least 88%, better at least 95%, better at least 98%, or better at least 99%. The spectral ranges with low absorption factor are 1) the wavelength of the transmitter (H), the transmitter wavelength, 2) related to only to the compensation path the wavelength of the compensation transmitter (K), the compensation transmitter wavelength, and 3) the wavelength of the radiation to be detected, which means the fluorescence wavelength and/or the wavelength of the transmitter (H) for example.

This statement relates especially to wavelengths that might lead to a signal in the receiver (D) in case of exposure.

At all wavelengths the device wall materials should have an absorption factor of optimally 100%, or at least 25%, better at least 50%, better at least 75%, better at least 88%, better at least 95%, better at least 98%, or better at least 99%. Obviously this statement is not valid for optically transparent parts like lenses for example. This statement relates especially to wavelengths that might lead to a signal in the receiver (D) in case of exposure.

To prevent the transmitter (D) from directly transmitting into the receiver (D) a second barrier (B2) as already known from EP2418512A1 for example is useful. It prevents this or it prolongs at least the optical path or it damps the unwanted direct signal in another way.

To ensure that the compensation transmitter (K) can transmit into the receiver (D) only via a reflection at a reflector (R) the compensation transmitter (K) is located in a compensation transmitter cavity (CAV_K). Therefore it is surrounded by a third optical barrier (B3). The third optical barrier (B3) has a compensation path window (WK). The compensation transmitter (K) is able to transmit into the receiver (D) through the compensation path window (WK) via a reflector (R). The receiver (D) is located in its own receiver cavity (CAV_D). The compensation path window has an aperture function in parallel which prevents the input of compensation transmitter light into other optical paths. Such other optical paths might terminate on the object (O) for example. This is of special importance if the wavelength selectivity of the filters (FD, FH) discussed before is not sufficient.

Figure 2:
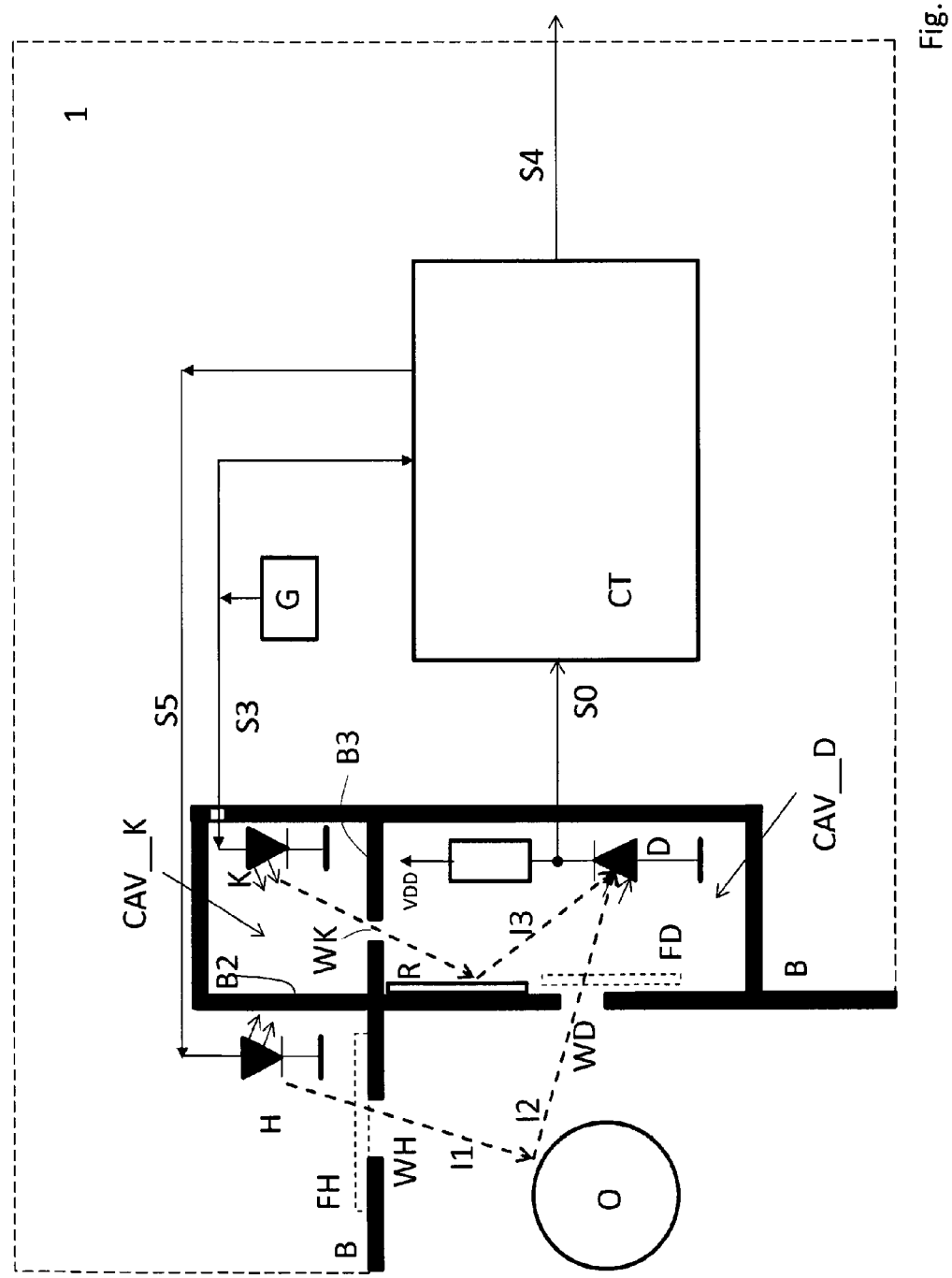
FIG. 2 is a diagram of an exemplary device for measuring an optical transmission path according to the principles of the disclosure.
Figure 3:
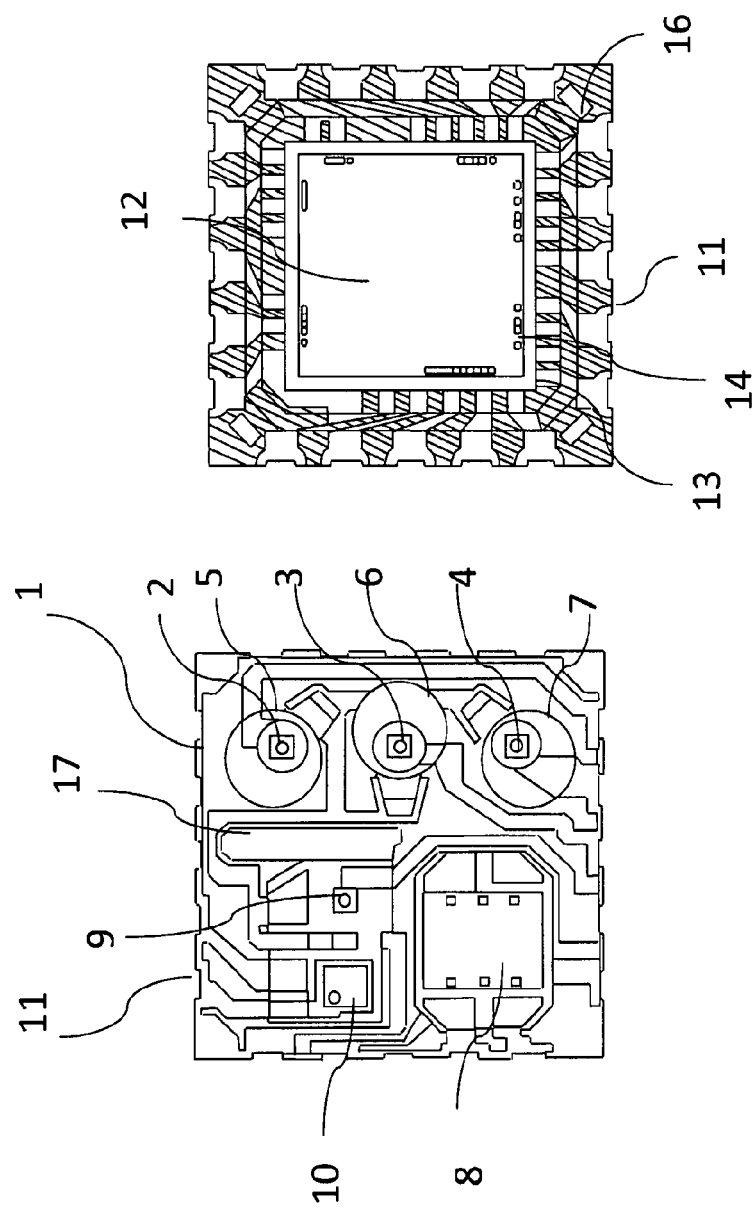
FIG. 3 is a top view of the exemplary device according to FIG. 1.

EP2418512A1 discloses already a barrier (FIG. 2 or FIG. 3, reference number 40, of EP2418512A1). The function of such a third optical barrier (B3) which is additional to the disclosure of EP2418512A1, is not disclosed in EP2418512A1. Such a barrier can be found in the teaching of DE102010028967A1 (FIG. 14, reference number 264 of DE102010028967A1). The aperture function is not explicitly disclosed in DE102010028967A1.

FIG. 2 shows the exemplary device according to FIG. 1. In contrast to FIG. 1 the transmitter (H) is controlled instead of the compensation transmitter (K).

FIG. 3 shows the exemplary device in an exemplary top view. In the exemplary device there are three LEDs (2, 3, 4) used as transmitters (H) and a photodiode (9) used as a receiver (D). As a matter of course more receivers and a differing number of transmitters might be used. The controller (CT) and when indicated the generator (G) shall be adjusted if necessary. The photodiode (9) receives the light of the transmitter (H), the LEDs (2, 3, 4) after reflection by the object (O). The object (O) is not drawn in the figure and is located above the plane of projection in direction to the observer. Furthermore a preamplifier (8) is part of the device (1). The compensation transmitter (K) is part of the device (1) as well. All elements (2, 3, 4, 10, 9, 8) are mounted on the top side of a common lead frame.

Wire bonds, preferably gold wire bonds may be used to form the electrical connections. In addition in the function of the second barrier (B2) a nose-piece (17) is shown, which optically separates the transmitter diodes (2, 3, 4) from the photo diode (10), the photo diode (10) acting as the receiver (D). Above each transmitter diodes (2, 3, 4) there are lenses (5, 6, 7) associated respectively with the transmitter diodes (2, 3, 4) to perform the light beam forming.

The packaging technology is a molded interconnection device technology. In the molded interconnection device technology a three-dimensional modified lead-frame is molded within mold compound.

The advantage of such a molded interconnection device technology (MID technology) is the possibility to directly construct electrical circuits within the device. Otherwise such electrical circuits must be typically manufactured in PCB or FCB technology. The circuit construction is performed via a special lead-frame structure.

An integrated analysis circuit (12) (IC) to drive the transmitters (2, 3, 4), to analyze the receiver (D)—here the photo diode (10)—signals and to drive the compensation transmitter (K)—here the compensation transmitter diode (9)—and to communicate (via S4) with the computer of the application system is located on the backside of the MID lead-frame. Such an application system might be a mobile phone for example.

The integrated analysis circuit (12) typically contains a controller (CT). Bonds connect the contacts (e.g. 14) of the integrated analysis circuit (12) with the contacts (e.g. 13) of the lead-frame. Preferably the integrated analysis circuit (12)

is located in a recess formed in the package. Therefore mold compound covers the wire bonds after molding.

The special lead frame form enables soldering on the side of the package.

For handling during assembly there are special slots (16) in this example. They prevent scratches on contacts (11) if a gripper utilizing these slots as clamp points is used.

As explained above a significant problem to be solved is the suppression of the parasitic coupling between the transmitter diodes (2, 3, 4) and the receiver (D), here the photodiode (10). For this purpose the package has an optical bather (17) which extends the optical path between the transmitters (2, 3, 4) and the receiver (D), here the photodiode (10). This reduces the coupling via parasitic paths.

The shape of the optical barrier (17) has several degrees of freedom. In particular the barrier (17) might have beveled side walls to ensure that the whole package might be ejected out of the molding tool without any difficulty.

Figure 4:
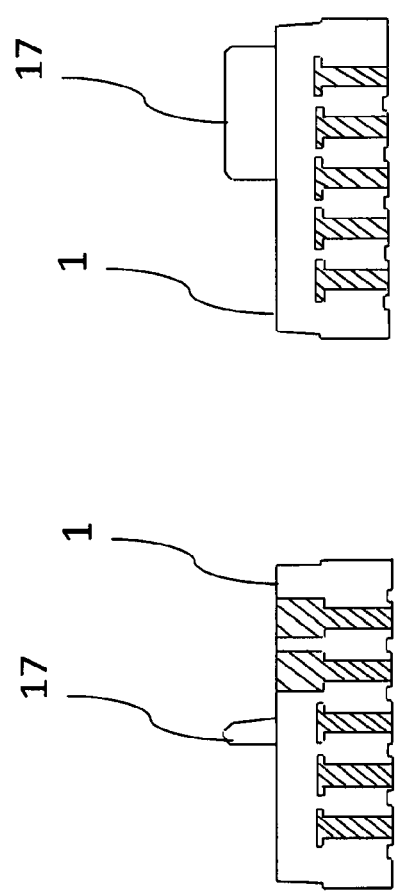
FIG. 4 illustrates an exemplary position of a barrier shown in the top view according to FIG. 3.

From two different perspectives FIG. 4 shows an exemplary position and form of the barrier (17) on the package top side. This barrier (17) extends the parasitic optical path.

Figure 5:
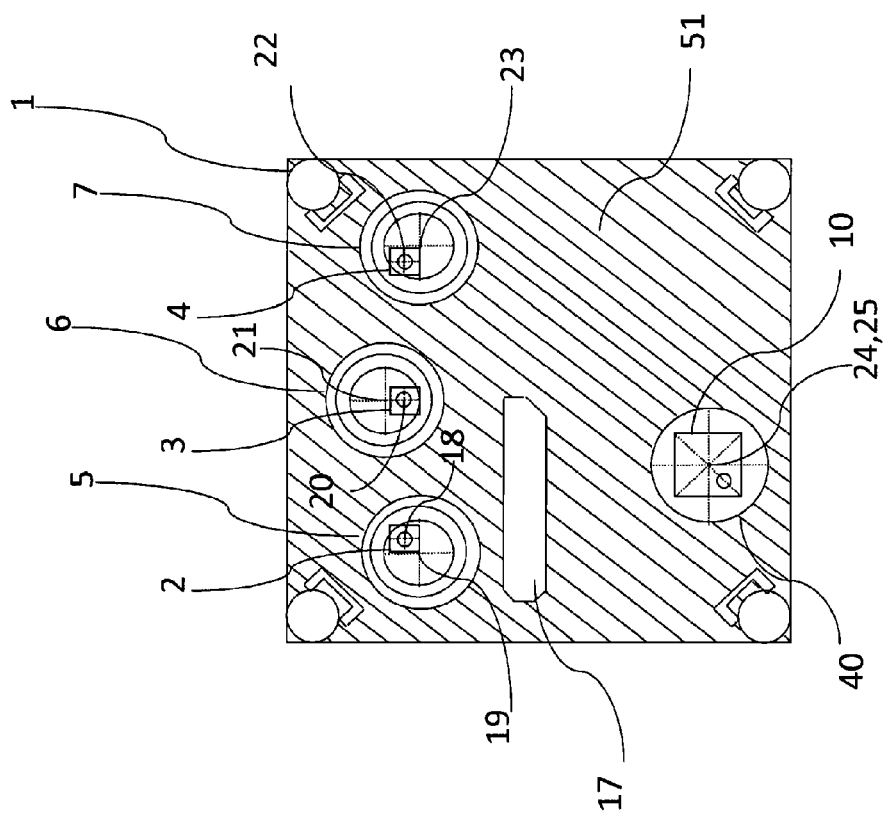
FIG. 5 illustrates exemplary locations of sensor center points to lens optical axes in the exemplary device according to FIG. 1.

The integrated micro lenses (5, 6, 7, 40) are of special importance. They are located above the transmitters (2, 3, 4) and the receiver (D), here the photodiode (10). This is shown in FIG. 5. The lenses (5, 6, 7, 40) are made of an optically transparent material. Regarding their transparency the preceding explanations are referenced.

On a transmitter side the lenses (5, 6, 7, 40) direct the emitted light beam of the respective transmitters (2, 3, 4) in a preferred direction and form the light beam. Typically the center points (18, 20, 22) of the transmitters (2, 3, 4) have an offset with respect to the optical axis of the corresponding lens (5, 6, 7).

Depending on the value and direction of the offset of the corresponding lens(5, 6, 7) the direction of the transmitter beam lobe (36, 37, 38) of the corresponding transmitter diode (2, 3, 4) changes. The size, form and focal length of the corresponding lens (5, 6, 7) determine the form of the corresponding beam (36, 37, 38). Such lenses are known from US20050184301A1 for example. The lenses (5, 6, 7, 40) do not need to have cylindrical symmetry. It is possible that the lenses (5, 6, 7, 40) be of different forms. For example, they might be elliptical.

Such lenses might have more than two focal lengths. The lenses might be manufactured by injection molding of transparent plastic material.

The transparency is referenced to the wavelength of radiation used for transmission and reception. In a similar way lens (40) might form a receiver reception lobe on the receiver side. The center points (24) of the receivers, here photo diodes (10), might have an offset with respect to the optical axis (25) of the corresponding lenses (4) as well. This is analog to the method to form the transmitter beam lobe as described above.

In the example of FIG. 5 the center point (24) and the center of the optical axis (25) are located on top of each other. This is not the case in all potential applications of the disclosure as explained.

It is of special advantage if the receiver reception lobe or receiver reception lobes are formed such that the overlap between the receiver reception lobes and the transmitter beam lobes is maximized in the space of interest above the sensor. This maximizes the system sensitivity, which is of special importance for motion detection.

If the system is to be used for gesture recognition it is useful if the transmitter beam lobes (36, 37, 38 are oriented in different directions. The beam orientation might be rotated by 120° versus each other around an axis vertical to the top surface of the device. It is useful if the transmitter beam lobes overlap a little bit but such overlap should preferably be not more than 60°. This means that a transmitter beam lobe should not be broader than 240°. The receiver reception lobe should cover the whole relevant space of interest.

It is of special advantage, if the relevant lens (40) of the corresponding receiver (D) (photodiode (10)) is transparent for wavelengths used by the transmitter diodes (2, 3, 4). The wavelengths of the transmitter diodes (2, 3, 4) need not to be identical. It is possible to choose different colors or wavelengths for multiple transmitter diodes (2, 3, 4).

This enables the manufacture of a miniaturized color sensor. The receiver (D), here the photodiode (10), might be sensitive to visible light of all colors and infrared light. Three LEDs having the colors red (2), blue (3) and green (4) might act as the transmitters (2, 3, 4). An infrared LED might then act as the compensation transmitter (D, 9).

Figure 6:
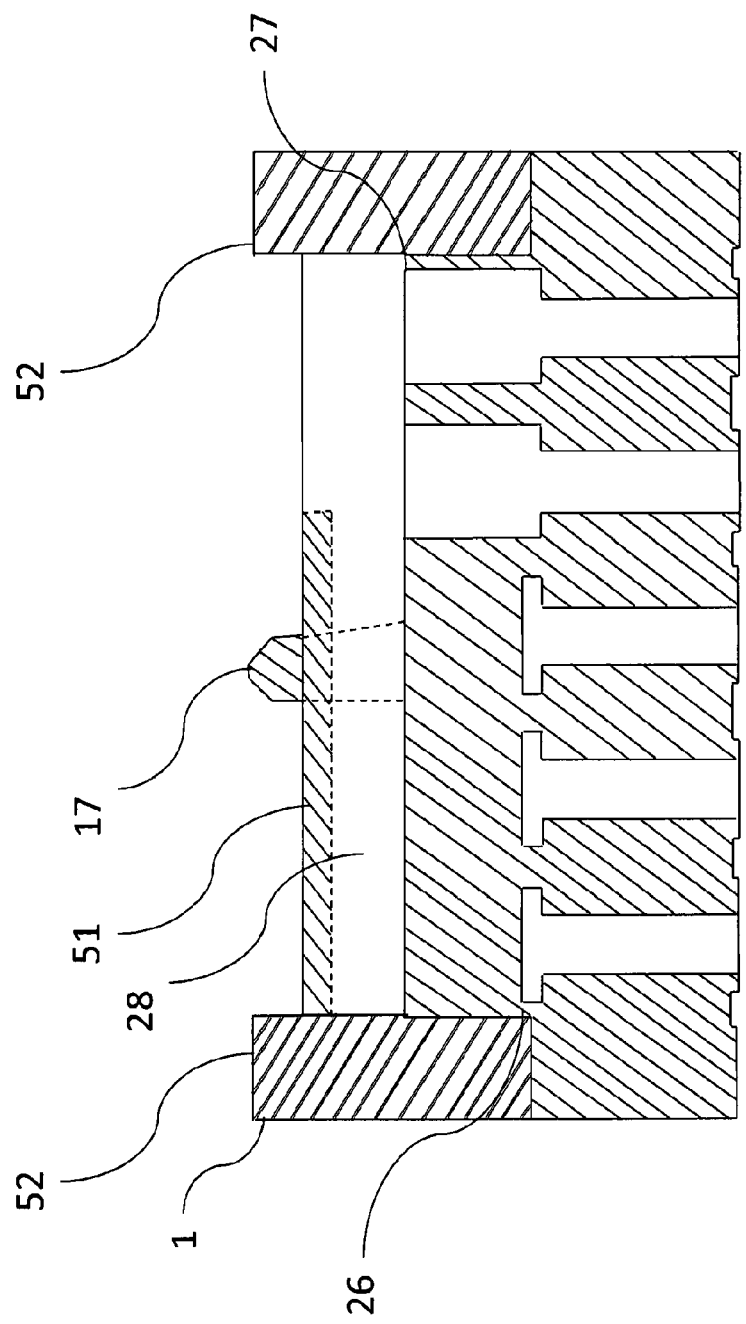
FIG. 6 illustrates a cross section of the exemplary device according to FIG. 1.

FIG. 6 shows a cross section of an exemplary device according to the principles of the disclosure. In the case of the exemplary device the lead frame has two layers (27, 26). This enables usage of devices with different device height.

A wall (52) surrounds the cavities where the devices (2, 3, 4, 8, 9, 10, 12) are located.

On the side of the transmitters (2, 3, 4, 9) and receiver (D), here photodiode (10), the transmitter cavity and the compensation transmitter cavity (CAV_K) are typically filled with a transparent mold compound (28) with a high refraction index. In the area of the compensation transmitter (K), in this case the compensation diode (9), a cover (51) is attached to the cavity (28) which will be described later.

Figure 7:
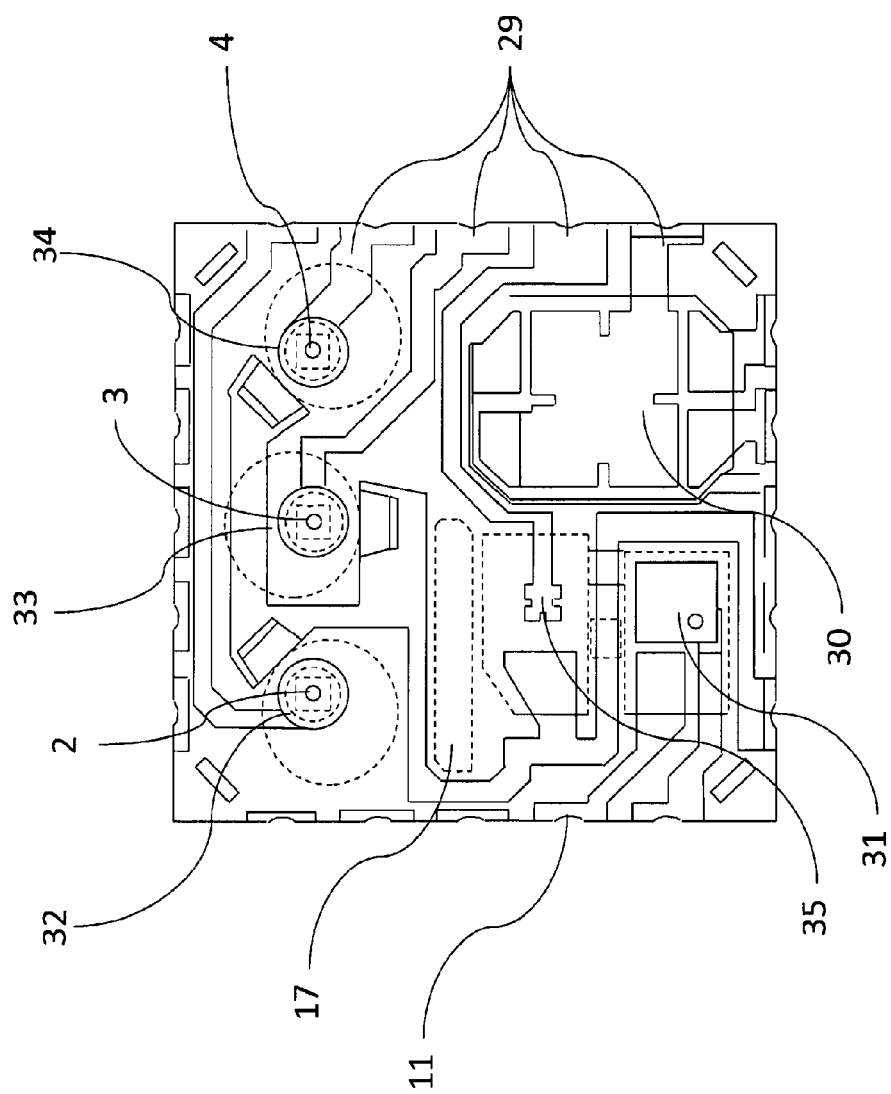
FIG. 7 illustrates a horizontal cut through of the exemplary device according FIG. 1.

FIG. 7 shows a horizontal cut through the exemplary device.

There are different interconnection lines (29) which are part of the MID lead-frame. The transmitters (2, 3, 4) are attached to die-paddles (32, 33, 34) typically by gluing or soldering. Soldering is advantageous if high thermal loads have to be removed from within the device. The position of the barrier (17) is shown for better orientation.

A portion of the electrical connection lines (29) lead to contacts (11) of the exemplary device. Also, internal connections are possible. Such internal connections require a support that is cut after completion of the mold process. The compensation transmitter (9), here the compensation diode (9) is attached to a suitable die paddle (35) as well. The receiver (D), here the photodiode (10) is attached to the corresponding die paddle (31) and the preamplifier (8) to its die-paddle (30).

FIG. 8 shows again the different exemplary orientations (36, 37, 38) of the transmitter beam lobes of the transmitter diodes (2, 3, 4) of the exemplary device (1) and the corresponding lenses (5, 6, 7, 40). The barrier (17) is again shown for better orientation.

FIG. 9 demonstrates how the orientations of the receiver and transmitter beams are performed. To be able to orient the transmitter beam lobes differently as shown in FIG. 8 it is useful if the transmitter diode is moved by 15° out of the axis. The lens has a diameter of 200 μm for example. The optical axis of the transmitters (18, 20, 22) or the receiver (24) respectively are at the height of the transmitters (1, 3, 4) or the receiver (D) (photodiode (10)) shifted by a distance (b1) vs. the optical axis (19, 21, 23, 25) of the corresponding lens. The light of the transmitter (2, 3, 4) enters the bottom side (41) of the lens and is directed by the lens to the direction opposite to the transmitter.

FIG. 10 shows another horizontal cross section the exemplary device (1). The special slots (16) for handling during assembly can be recognized. The transmitters (2, 3, 4) are located in separate transmitter cavities (53, 54, 55). These cavities cause an excellent decoupling. The compensation transmitter (K) possesses its own compensation transmitter cavity (CAV_K), here cavity (57) for the compensation diode (9), which is separated by a nose-piece (48) from the corresponding receiver cavity (CAV_D), here the cavity (56) for the photodiode (10). In one area (49) this nose-piece (48) is modified in its height such that light is able to pass from the compensation transmitter (H)—here the compensation diode (9)—to the receiver (D), which means the photodiode (10), as described below. The cavities are optically open to the top side with the exception of the compensation transmitter cavity.

There remains the problem of optimal optical coupling of the compensation transmitter (K), here the compensation diode (9), and the receiver (D), here the photodiode (10). This coupling is discussed in FIGS. 11 and 12.

FIG. 11 shows a cross section of an exemplary disclosure conforming device (1) through the compensation transmitter (K), here the compensation diode (9), and the receiver (D), here the photodiode (10). In particular the receiver (D), here the photodiode (10), should be irradiated from its top side and not from its other side by the light of the compensation transmitter (K), here the compensation diode (9) because the light sensitive layer of the photodiode (10) is typically located on its surface.

In the exemplary disclosure conforming device (1) this problem is solved by the compensation transmitter (K), here the compensation diode (9) transmitting light toward the top. The different refraction indices between the transparent cover material (28) and air reflect the light back into the package. This reflection appears if the incidence-angle of the light of the compensation transmitter (K), here the compensation diode (9), on the interface of the transparent cover material (28) is so flat that total reflection occurs. This light is reflected as intended from the top of the device and onto the receiver (D), the photodiode (10). (See also FIG. 12) Light which might pass directly from the compensation transmitter (K), here the compensation diode (9), to the receiver (D), here the photodiode (10), might be scattered by the receiver (D), reach the object (O) and then be reflected by the object into the photodetector (10), thereby disturbing the measurement signal (S4) and the controller (CT).

The nose-piece (48) separating the receiver cavity (CAV_D), here cavity (56) of the photodiode (10), from the compensation transmitter cavity (CAV_K), here cavity (57) of the compensation diode (9), prevents this. Only that portion of light of the compensation transmitter (K), here compensation diode (9), which is reflected at the interface of the transparent cover material (28), is able to illuminate the receiver (D), here the photodiode (10). The opening (49) above the nose-piece (48) to enable this intended transmission from the compensation transmitter cavity (CAV_K), here cavity (57) to the receiver cavity (CAV_D), here cavity (56), is designed so that the light transferred along this path illuminates only the receiver (D), here the photodiode (10). The opening (49) operates like an optical wave guide.

To prevent an indirect illumination of the object (O) by the compensation transmitter (K) (compensation diode (9)) it is required to remove light from the system (1) as fast as possible, so that is not irradiated onto the receiver (D), here the photodiode (10), by total reflection.

For this purpose the package of the disclosure conform device (1) is preferably made of a material which absorbs all radiation in wavelength ranges in which the light might escape from the package and in all wavelength ranges in which the transmitters (2, 3, 4, 9) are transmitting.

In order to diffusely scatter the small amount of light that is reflected in spite of the measures discussed above, all surfaces should be manufactured to have a matt surface. This does not apply to optical surfaces like the upper interface layer of the transparent cover material (28), where total reflection should occur, and surfaces of optical windows (WD, WH) or filters (FD, FH) or lenses (5, 6, 7, 40).

There is an absorber (51) placed on the upper interface layer which absorbs the radiation of the compensation transmitter diode (9) that is not reflected by total reflection onto the receiver (D), here the photodiode (10) and that would be able to exit the disclosure conform device (1) in an unregulated manner. The absorber (51) removes such light from the system.

The angles and forms of package surfaces should be designed so that no light path resulting from multiple reflections might end on the receiver (D), here a photodiode (10).

A further problem is the reflection by the receiver (D), here the photodiode (10), itself. To enable penetration of the light into the receiver (D), here the silicon of the photodiode (10), it has to be irradiated onto the receiver (D) in at as nearly a right angle as possible, because the speed of light in the material of the receiver (D) and here in particular of the silicon of the photodiode, is significantly smaller than in the wave guide.

For this purpose it is useful but not necessary that the die paddle (31) of the receiver (D), here the photodiode (10) is tilted relative to the angle of the die paddle (35) of the compensation transmitter (K), here compensation diode (9). This tilt might lead to a reduced sensitivity of the receiver (D), here the photodiode (10), regarding the reception of optical radiation being reflected back by the object (O).

Therefore it is useful to improve the coupling into the receiver (D), here the photodiode (10) using a sloped prism, as used for the transmitter (H), here the transmitter diodes (2, 3, 4).

Finally it must be considered that the receiver (D) and in particular in this case the photodiode (10) typically made of silicon might be transparent for a portion of the radiation. In this case it might happen that a reflection takes place on the back side of the receiver (D), the photodiode (10). This increases the efficiency of the receiver (D), the photodiode (10), but causes a distortion of the receiver output signal (S0).

Therefore it is useful to attach the receiver (D), here the photodiode (10), to the die paddle (31) using a glue which is absorbing for wavelengths that might pass through the receiver (D), the photodiode (10).

The invention claimed is:

1. A device for measuring an optical transmission path wherein:
   at least one optical transmitter transmits into at least a first transmission path;
   at least one object that is not part of the device and which is located at an end of the first optical transmission path is able to reflect light into at least one second optical transmission path that is terminated with at least one receiver;
   the receiver is able to receive at least one transmitter signal of the optical transmitter after modification by passage through the first optical transmission path and/or the second optical transmission path and/or by reflection on the object and convert the at least one transmitter signal into at least one receiver output signal;
   a controller includes at least one controller output that outputs a controller output signal that can be used outside of the device;
   the controller constructs a compensation signal and/or the transmitter signal based on the receiver output signal;

the controller output signal represents a representative measured value for at least one property of the first transmission path or said second optical transmission path or a representative measured valued for at least one property of the object and the controller output signal issues the representative measured value at least upon request;

a compensation transmitter transmits into at least a third transmission line;

the third transmission line ends at the receiver;

the receiver receives at least the compensation signal of the compensation transmitter superimposed with the transmitter signal;

the controller controls the compensation transmitter and/or the optical transmitter so that the receiver output signal contains no more components of the transmitted signal and/or contains no portions of the compensation signal except a control error and system noise;

an optical receiver path filter is part of the device and is part of at least one second optical transmission path;

the optical receiver path filter has a transmissivity for the wavelength of the light of the optical transmitter and/or for the wavelength of the light to be detected of at least 50%, or better 75%, or better 88%, or better 95%, or better 98%, or better 99%;

the optical receiver path filter has a transmissivity for the wavelength of the light of the compensation transmitter of at most 50%, or better at most 25%, or better at most 12%, or better at most 5%, or better at most 2%, or better at most 1%;

the optical receiver path filter has an absorption factor for the wavelength of the light of the compensation transmitter of at least 25%, or better at least 50%, or better at least 75%, or better at least 88%, or better at least 95%, or better at least 98%, or better at least 99%;

the compensation transmitter and at least one receiver are separated by a nose-piece so that a direct illumination of the receiver by the compensation transmitter is not possible;

the compensation transmitter is placed in a first cavity and in which the nose-piece is part of the wall of the first cavity;

the receiver is placed in a second cavity and in which the nose-piece is part of the wall of the second cavity;

the receiver and the compensation transmitter are connected by at least one compensation optical path that is able to transmit light by at least one reflection at a reflector from the compensation transmitter onto the receiver;

the optical transmitter and the receiver are separated by at least one nose piece such that a direct illumination of the receiver by the optical transmitter is not possible;

the optical transmitter and the receiver are optically separated by at least one optical barrier;

the device possesses at least one absorber that prevents the emission of light of at least the compensation transmitter in at least one predefined direction and/or in a direction toward at least one object (O) to be measured; and the optical transmitter and the compensation transmitter of the device transmit with different center wavelengths.

2. The device of claim 1 wherein:

at least one optical transmission path filter is part of the device and is located in at least one of the second optical transmission paths;

the transmission path filter has preferably for the wavelength of the light of the transmitter, a transmissivity of at least 50%, or better at least 75%, or better at least 88%, or better at least 95%, or better at least 98%, or better at least 99%;

the transmission path filter has preferably for the wavelength of the light of the transmitter, a reflectivity of at most 50%, or better at most 25%, or better at most 12%, or better at most 5%, or better at most 2%, or better at most 1%;

the transmission path filter has preferably for the wavelength of the light of the compensation transmitter, a transmissivity of at most 50%, or better at most 25%, or better at most 12%, or better at most 5%, or better at most 2%, or better at most 1%; and the transmission path filter has preferably for the wavelength of the light of the compensation transmitter an absorption factor of at least 25%, or better at least 50%, or better at least 75%, or better at least 88%, or better at least 95%, or better at least 98%, or better at least 99%.

3. The device of claim 2 wherein:

there is at least one lens in one of the at least one first optical transmission path or the at least one second optical transmission path, the at least one lens being a part of the device;

a center point of the at least one transmitter or the at least one receiver is offset from the optical axis of at least one corresponding lens but is optically coupled with that lens.

4. The device of claim 2 wherein at least two transmitter beam lobes do not overlap with each other.

5. The device of claim 4 wherein at least two receiver receptions lobes do not overlap with each other.

6. The device of claim 2 wherein at least one receiver reception lobe and transmitter beam lobe have overlapping volumes.

7. The device of claim 1 wherein a die paddle of the receiver is tilted relative to a die paddle of the compensation transmitter.

8. The device of claim 7 wherein the receiver is attached to the die paddle with a glue absorbing light of wavelength ranges which are able to pass through the receiver, the receiver being a part of a particular photodiode.

9. The device of claim 1 wherein:

the center wavelength of the transmitter is different from the center wavelength of the radiation to be detected;

the receiver path filter has for the wavelength of the light to be detected a transmissivity of at least 50%, or better at least 75%, or better at least 88%, or better at least 95%, or better at least 98%, or better at least 99%;

the receiver path filter has for the wavelength of the light of the optical transmitter a transmissivity of at most 50%, or better at most 25%, or better at most 12%, or better at most 5%, or better at most 2%, or better at most 1%;

the receiver path filter has for the wavelength of the light of the transmitter an absorption factor of at least 25%, or better at least 50%, or better at least 75%, or better at least 88%, or better at least 95%, or better at least 98%, or better at least 99%.

* * * * *